United States Patent
Kelber (10) Patent No.: US 11,458,955 B2
(45) Date of Patent: Oct. 4, 2022

(54) ANTI-ROLLOVER FOR HARVESTERS WITH ELECTRONIC STEERING

(71) Applicant: AGCO Corporation, Duluth, GA (US)

(72) Inventor: Christian Roberto Kelber, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 459 days.

(21) Appl. No.: 16/538,257

(22) Filed: Aug. 12, 2019

(65) Prior Publication Data
US 2020/0062241 A1 Feb. 27, 2020

Related U.S. Application Data

(60) Provisional application No. 62/721,100, filed on Aug. 22, 2018.

(51) Int. Cl.
| | |
|---|---|
| *B60W 30/04* | (2006.01) |
| *B62D 5/00* | (2006.01) |
| *B60W 10/20* | (2006.01) |

(52) U.S. Cl.
CPC ............ *B60W 30/04* (2013.01); *B60W 10/20* (2013.01); *B62D 5/005* (2013.01); *B60W 2510/20* (2013.01)

(58) Field of Classification Search
CPC ............... A01B 69/004; A01B 69/008; A01D 41/1278; B60W 30/02; B60W 30/04; B60W 2030/043; B60W 10/20; B62D 5/005
See application file for complete search history.

(56) References Cited

U.S. PATENT DOCUMENTS

| | | | | |
|---|---|---|---|---|
| 5,386,365 A | * | 1/1995 | Nagaoka ............... | B62D 7/159 701/44 |
| 6,453,226 B1 | * | 9/2002 | Hac ....................... | B62D 7/159 180/41 |
| 10,392,007 B1 | * | 8/2019 | Brown ................. | G05D 1/0891 |

(Continued)

FOREIGN PATENT DOCUMENTS

| | | | | |
|---|---|---|---|---|
| BR | 102013023161 A2 | | 7/2015 | |
| CN | 101332833 A | * | 12/2008 | ......... B60G 17/0161 |

(Continued)

OTHER PUBLICATIONS

European Patent Office, Search Report for related European Application No. EP 19 18 8887, dated Jan. 27, 2020.

(Continued)

*Primary Examiner* — Russell Frejd
*Assistant Examiner* — Sara J Lewandroski (57) ABSTRACT

In one embodiment, a steering system for a machine, the steering system comprising: a steer-by-wire system configured to provide rear wheel based steering, the steer-by-wire system comprising: a human-machine-interface (HMI) configured to provide a force feedback to the HMI that influences the HMI to a center position; plural sensors; and one or more controllers configured by executable code to receive input from one or more of the plural sensors and reduce a risk of rollover by: causing the rear wheels to maintain or return to straight forward travel in conjunction with the force feedback; and limiting a steering angle of the machine, beyond which a rollover condition occurs, based on computation of a rollover equation with parameters corresponding to the input and machine geometry.

17 Claims, 10 Drawing Sheets

(56) References Cited

U.S. PATENT DOCUMENTS

| | | | |
|---|---|---|---|
| 2001/0052893 A1 | 12/2001 | Jolly et al. | |
| 2008/0109135 A1* | 5/2008 | Lemmen | B62D 6/002 701/41 |
| 2008/0281487 A1* | 11/2008 | Milot | B60G 17/0195 701/1 |
| 2009/0076673 A1* | 3/2009 | Brabec | G05D 1/0061 701/23 |
| 2011/0022267 A1* | 1/2011 | Murphy | B60W 50/14 701/124 |
| 2012/0029771 A1 | 2/2012 | Mackin et al. | |
| 2013/0073147 A1* | 3/2013 | Tashiro | B66F 9/07568 701/42 |
| 2014/0343697 A1 | 11/2014 | Kuipers | |
| 2015/0034407 A1* | 2/2015 | Guerster | B62D 5/008 180/402 |
| 2016/0039455 A1 | 2/2016 | Zeller et al. | |
| 2016/0107641 A1* | 4/2016 | Cosentino | B60G 17/019 701/41 |
| 2017/0210420 A1* | 7/2017 | Saeger | B62D 15/025 |
| 2020/0062241 A1* | 2/2020 | Kelber | B62D 5/005 |

FOREIGN PATENT DOCUMENTS

| | | | | |
|---|---|---|---|---|
| CN | 106585625 A | | 4/2017 | |
| CN | 108045368 A | * | 5/2018 | ............ B60W 30/04 |
| CN | 110789523 A | * | 2/2020 | |
| CN | 107310551 B | * | 4/2021 | ........... B60R 21/013 |
| DE | 10 2017 011302 A1 | | 8/2018 | |
| EP | 3438039 A1 | | 2/2019 | |
| EP | 3613652 A1 | * | 2/2020 | ............ B60W 10/20 |
| JP | 2011160767 A | | 8/2011 | |
| KR | 101447811 B1 | * | 10/2014 | ............. B60T 8/243 |
| WO | WO-2014191496 A1 | * | 12/2014 | ........... B60G 17/016 |
| WO | 2015/102630 A1 | | 7/2015 | |

OTHER PUBLICATIONS

UK Intellectual Property Office, Search Report for related UK Application No. GBIS14109.3 , dated Mar. 1, 2019.

* cited by examiner

ANTI-ROLLOVER FOR HARVESTERS WITH ELECTRONIC STEERING

CROSS REFERENCE TO RELATED APPLICATION

This application claims the benefit of U.S. Provisional Application No. 62/721,100, filed Aug. 22, 2018, which is hereby incorporated by reference in its entirety.

TECHNICAL FIELD

The present disclosure is generally related to harvesting machines, and, in particular, harvesting machines that use steer-by-wire technology.

BACKGROUND

Combine harvesters are machines with rear wheel steering systems. These machines are naturally unstable at higher speed due to their tendency to oversteer. Combine harvesters also possess a high center of gravity. If an operator is not fully concentrated, the instability created by the machine dynamics of rear wheel steering combined with the high position of center of mass of the combine harvester may lead to a rollover event when the combine harvester travels at higher speeds. For instance, combine harvesters have a tendency to rollover in case of over-steering during an evasive maneuver at higher speed on road conditions.

In case of machines with conventional hydrostatic steering, due to adjustments in the relationship between steering wheel turns and wheel angle, an over-steering situation can be naturally avoided. In case of an electronically controlled steering system (steer-by-wire), the reaction times are faster and, without any additional electronic measures, an over-steering situation can easily result.

Different proposals to improve dynamic stability are known, but they are normally considered for a machine with a conventional steering wheel and steering column and with an overlaid electro-hydraulic device. Dynamic stabilization of automotive vehicles is also known, but due to the steering mechanism characteristics, an overlaid system is necessary.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

In one embodiment, a steering system for a machine, the steering system comprising: a steer-by-wire system configured to provide rear wheel based steering, the steer-by-wire system comprising: a human-machine-interface (HMI) configured to provide a force feedback to the HMI that influences the HMI to a center position; plural sensors; and one or more controllers configured by executable code to receive input from one or more of the plural sensors and reduce a risk of rollover by: causing the rear wheels to maintain or return to straight forward travel in conjunction with the force feedback; and limiting a steering angle of the machine, beyond which a rollover condition occurs, based on computation of a rollover equation with parameters corresponding to the input and machine geometry.

DETAILED DESCRIPTION

Certain embodiments of a rollover risk reduction system are disclosed that combine plural electronic functions to avoid or generally, reduce the risk of a rollover event for a rear wheel (electronic) steering-based, moving machine, the electronic functions including any combination of active return to center (ARC), static over-steering avoidance (SOA), and dynamic stabilization with steering inputs (DSSI). In general, the ARC function influences the HMI towards the center while straightening out the harvester, the SOA function electronically limits the turning radius of the harvester according to the speed of the harvester, and the DSSI function causes a fast reflection (e.g., in a manner that may be transparent to the operator) of the steering angle to create a torque that counters a preceding steering movement. In the various embodiments described herein, a combine harvester is illustrative of an example rear wheel steering-based, moving machine, with steering achieved using an electronic steering system comprising steer-by-wire technology. As set forth in detail below, certain embodiments of a rollover risk reduction system contemplates that the combine harvester (hereinafter, referred to also as a harvester) is driven exclusively or primarily by electronic commands provided by an operator, the electronic commands generated based on direct operator interaction with a human-machine-interface (HMI). The HMI may be embodied in one of several types of forms, including as a joystick, mini-wheel, etc. The HMI is configured with a force-feedback function corresponding to return-to-center capabilities of the steering system enabled via ARC functionality. One or more controllers are used to adjust the position of the steerable wheels according to a steering angle set-point. Further, certain embodiments of a rollover risk reduction system do not need additional overlaid devices added to the available electronic steering system.

Digressing briefly, rear-wheel steering systems possess inherent instability issues at high speeds, particularly when used in mobile machines (hereinafter, referred to simply as machines, with the explanation below using a harvester as an illustrative example) that have a high center of mass. In contrast, certain embodiments of a rollover risk reduction system use the physics of when a rollover event commences to generate two or more electronic rollover countering functions to reduce the risk of a rollover event, with an added benefit of doing so without the need for an overlaid device.

Having summarized certain features of a rollover risk reduction system of the present disclosure, reference will now be made in detail to the description of a rollover risk reduction system as illustrated in the drawings. While a rollover risk reduction system will be described in connection with these drawings, there is no intent to limit it to the embodiment or embodiments disclosed herein. For instance, in the description that follows, though focus is on the implementation in a harvester, it should be appreciated by one having ordinary skill in the art that for some embodiments other mobile machines that use rear wheel electronic steering, particularly such machines with a high center of mass, may also benefit from the disclosed embodiments, and hence are contemplated to be within the scope of the invention. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the scope of the disclosure as defined by the appended claims. Further, it should be appreciated in the context of the present disclosure that the claims are not necessarily limited to the particular embodiments set out in the description.

Note that reference herein to steering control is to be understood as steering control characterized primarily by direct operator intervention with the HMI, as opposed to what may be characterized primarily as machine or satellite guided control. Note also that references hereinafter made to certain directions, such as, for example, "front", "rear", "left" and "right", are made as viewed from the rear of a harvester looking forwardly.

Figure 1A:
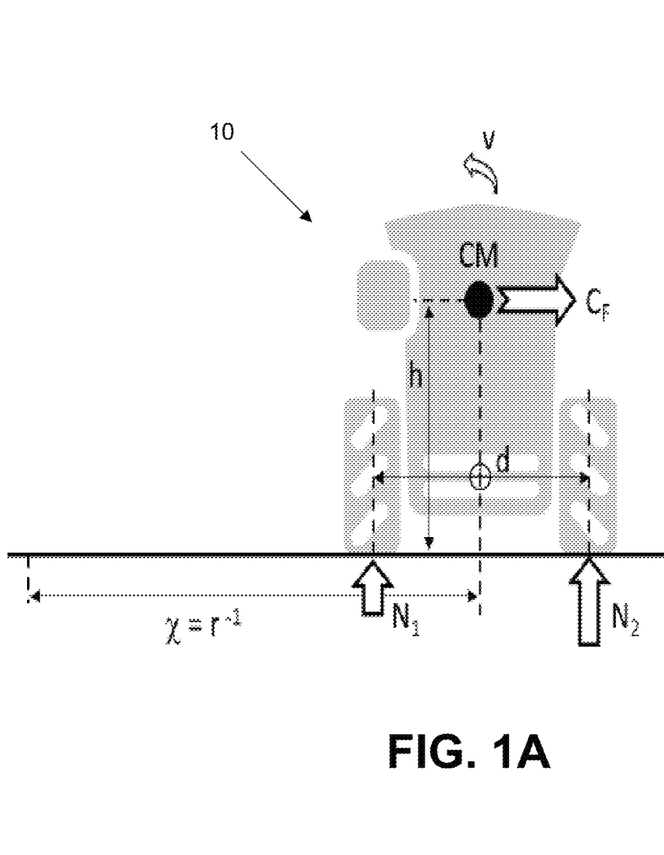
FIGS. 1A-1B are schematic diagrams that illustrate forces applied to a combine harvester during cornering that are considered in an embodiment of a rollover risk reduction system.
Figure 1B:
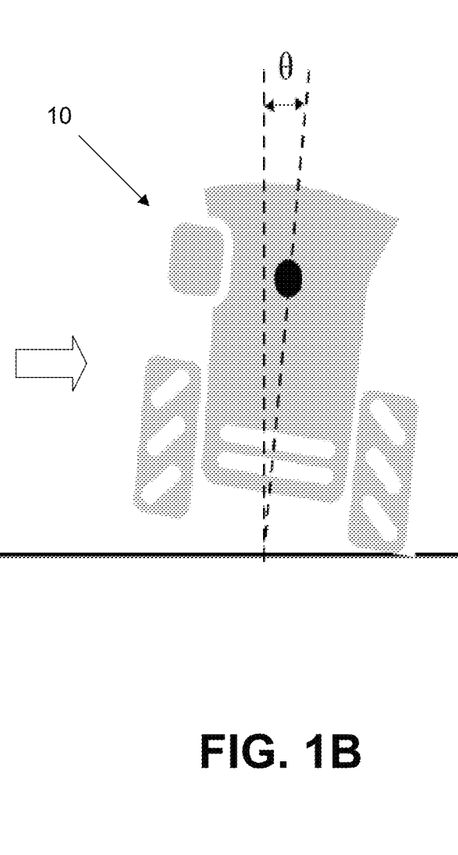

Referring now to FIGS. 1A-1B, shown is an illustration of a harvester 10 and various forces applied to the harvester 10 during cornering. The involved dimensions include axle distance or length (d), height (h) of a center of mass (CM) for the harvester 10, and curvature ($\chi$) performed by the harvester, the latter which can be considered the inverse of a curvature radius (r). With the harvester 10 cornering at ground speed (v), a centrifugal force (CF) can be considered applied to its center of mass (CM). In this situation, the normal forces N1 and N2, which are normally equal when the harvester 10 is following a straight path, become uneven and the harvester 10 tends to rollover with a roll angle ($\theta$), as illustrated in FIG. 1B. When the rollover event starts, N1 goes to zero. At this instant, the overturning curve radius is proportional to the square of the harvester speed, as set forth in the following (rollover) equation 1:

$$r=2*(h/(d*g))*v^2 \qquad \text{Equation 1}$$

where g represents earth gravity (approximately 9.8 meters per second squared).

Figure 2:
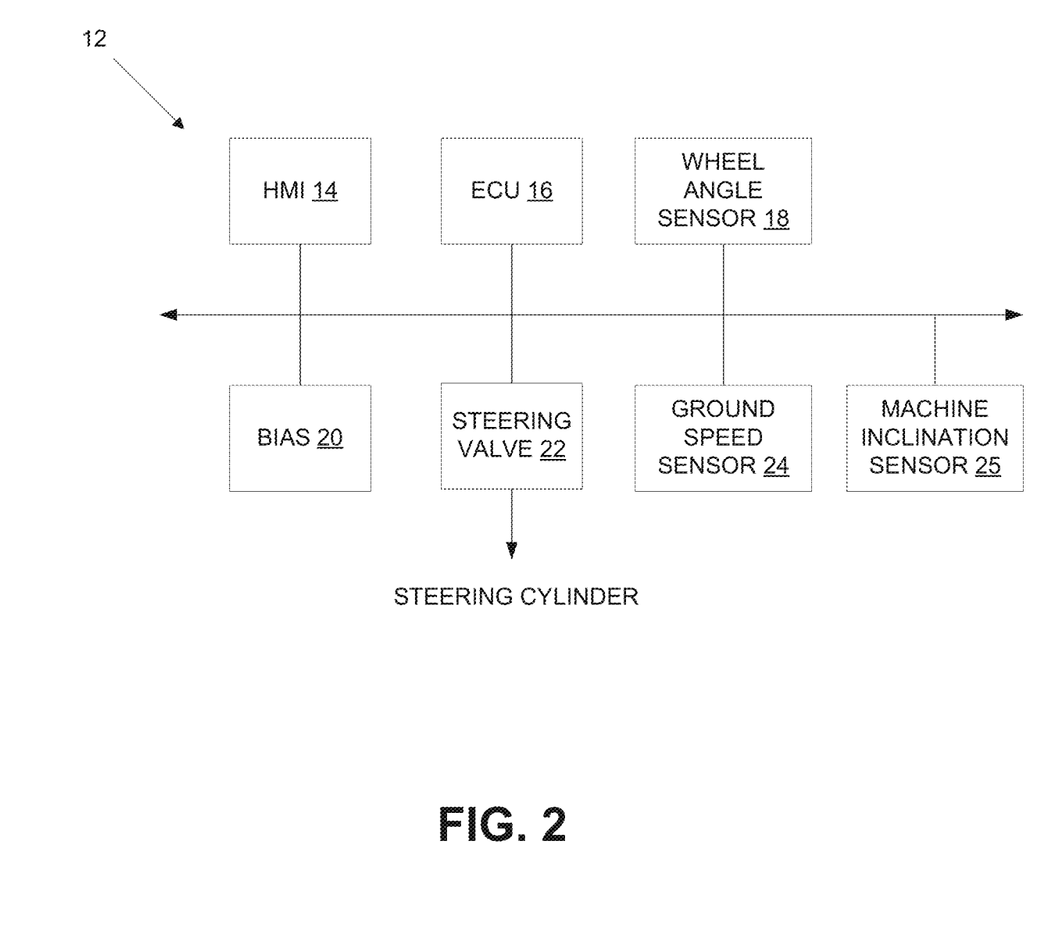
FIG. 2 is a block diagram that illustrates an embodiment of an example rollover risk reduction system.

Having described the example forces experienced by the harvester 10 leading up to a rollover event, attention is directed to FIG. 2, which illustrates an embodiment of an example rollover risk reduction system 12. It should be appreciated by one having ordinary skill in the art that the rollover risk reduction system 12 illustrated in FIG. 2 is merely illustrative of example rollover risk reduction functionality, and that some embodiments may include different features (e.g., additional or fewer features). For instance, the rollover risk reduction system 12 may be implemented as a fail operational system, which implies that there is redundancy in components (e.g., duplication in logic, steering valves, sensors, steering pumps, etc.) to ensure that the system operates safely and in a similar manner regardless of failure of a single component. Notably, certain embodiments of a rollover risk reduction system 12 do not require an overlaid system or device, including those using ARC, SOA, and DSSI functionality. In the depicted embodiment, the rollover risk reduction system 12 comprises an HMI 14, a controller or electronic control unit (ECU) 16, a wheel angle sensor 18, a biasing device (bias) 20, steering valve 22, a ground speed sensor 24, and a machine inclination sensor 25 (e.g., inertial sensor). Note that there may be additional components in some embodiments, as described above, including one or more controllers that cooperate to enable functionality of the rollover risk reduction system 12 and/or additional sensors, or fewer components (e.g. omission of the machine inclination sensor 25, for instance in embodiments where the DSSI functionality is omitted, or where functionality is combined in a single device).

The HMI 14 enables direct operator interaction with steering control logic of the harvester 10 (FIG. 1A), and may include a joystick, mini-wheel, among other devices that enable operator intervention. The HMI 14 converts the manipulations of the HMI by the operator into electronic steering commands submitted to the ECU 16, which in turn provides commands to the steering valve 22 to control the steering cylinder for rear wheel control. Note that in some embodiments, the HMI 14 may enable activation of additional machine functions via operator input to one or more controls (e.g., buttons, switches, knobs, etc.) located on the HMI 14.

The biasing device 20 provides for a force-feedback function for the HMI 14, and may include an electromagnetic motor, spring, resilient device, among other devices. The biasing device 20 and HMI 14 cooperate with the ECU 16 to enable a force-feedback function of the ARC functionality, as explained further below. In some embodiments, the biasing device 20 may be incorporated in the HMI 14.

The wheel angle sensor 18 detects the angle of the rear wheel, and hence is generally proximal to the rear wheel of the harvester 10 (FIG. 1A). In some embodiments, there may be a wheel angle sensor 18 for each rear wheel of the harvester 10 (FIG. 1A). The wheel angle sensor 18 may be embodied as an analog device (e.g., with steering angles corresponding to voltage differences) or a digital device (e.g., non-contact device, such as an optical sensor) that detects the rate of turn and angular position.

The ground speed sensor 24 is used to detect the ground speed or velocity of the harvester 10 (FIG. 1A), and may be embodied as a shaft encoder, radar device, photoelectric device, or other device (e.g., global navigation satellite system (GNSS) receiver), as is known.

The machine inclination sensor 25 senses the inclination of the harvester 10 (FIG. 1A), such as for use in the DSSI functionality, and may include an inclinometer, or inertial components (e.g., gyroscope) located in, for instance, a GNSS receiver of the harvester 10.

The steering valve 22 is used in cooperation with a hydraulic circuit that includes, among other known components, one or more steering pumps, reservoir, relief valve, etc. and which comprises an actuator that receives input from the ECU 16 to enable steering control via fluidic (hydraulic fluid) interaction with a steering cylinder controlling the rear wheel steering.

Electronic communications among the various components of the rollover risk reduction system 12 may be achieved over a controller area network (CAN) bus or via a communications medium using other standard or proprietary communication protocols (e.g., RS 232, etc.). Communication may be achieved over a wired medium, wireless medium, or a combination of wired and wireless media.

The ECU 16 provides the steering control logic for ARC, SOA, and DSSI functionality, and is explained further below.

Figure 3:
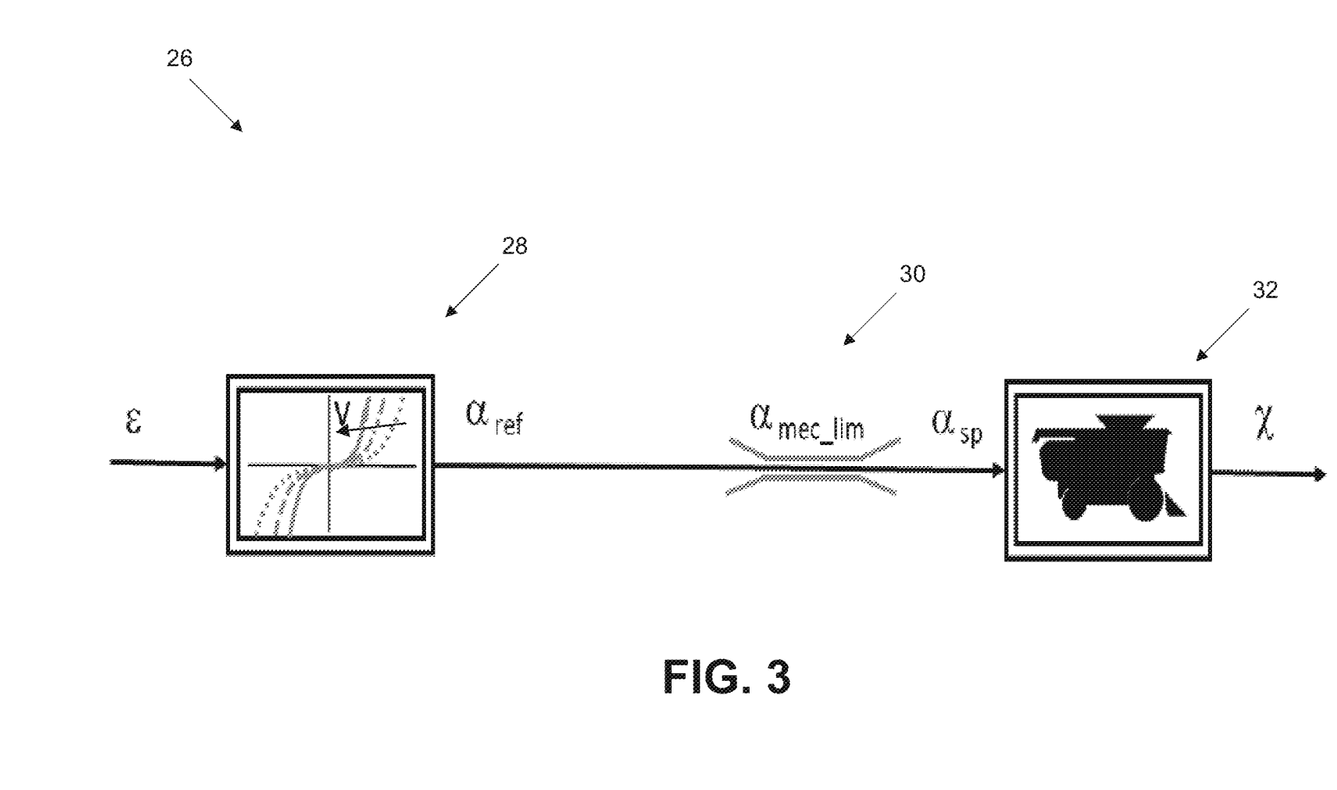
FIG. 3 is a schematic diagram that conceptually illustrates example rollover risk reduction system logic that implements active return to center (ARC) functionality.
Figure 4:
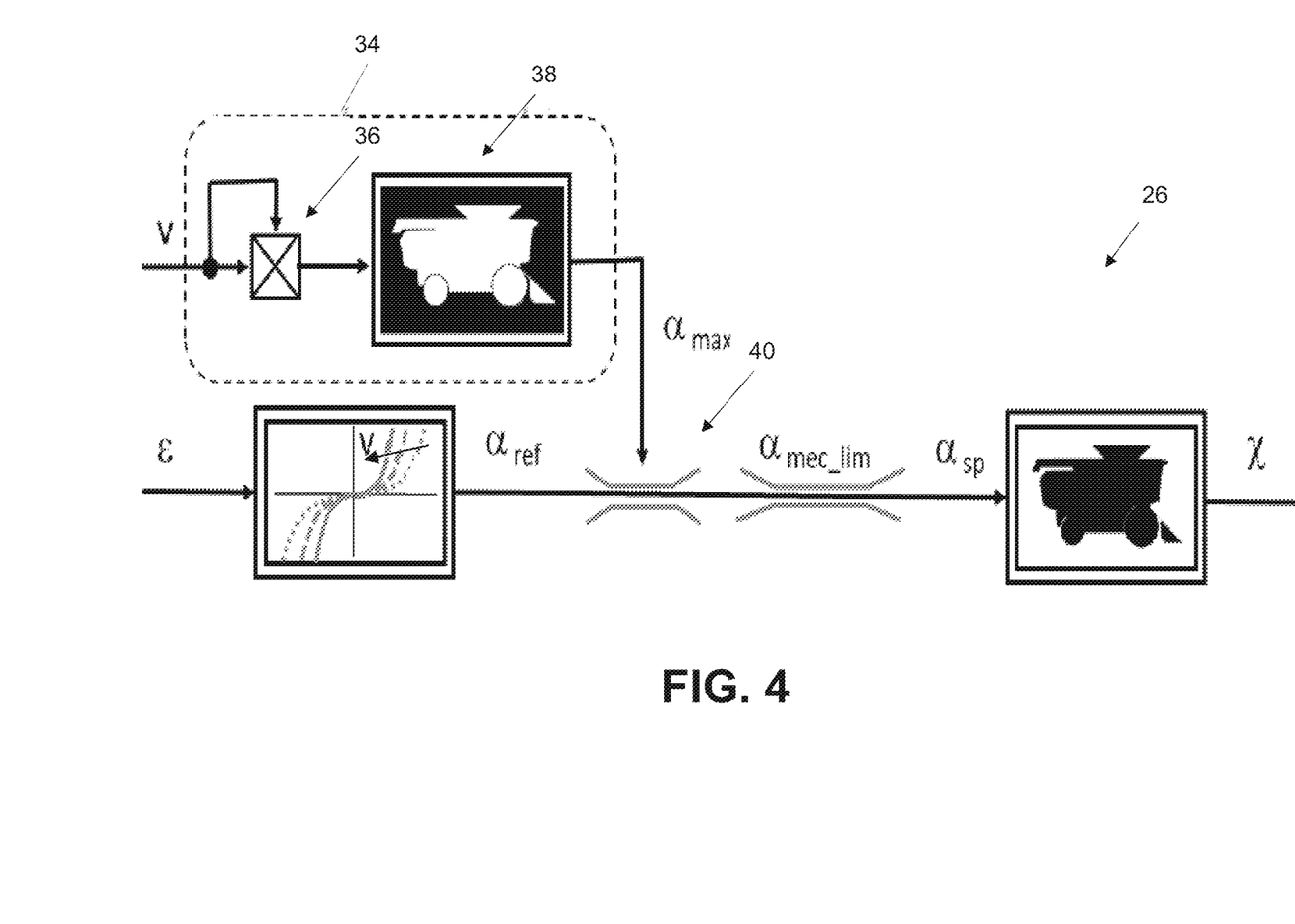
FIG. 4 is a schematic diagram that conceptually illustrates example rollover risk reduction system logic that implements oversteering avoidance (SOA) functionality.
Figure 5:
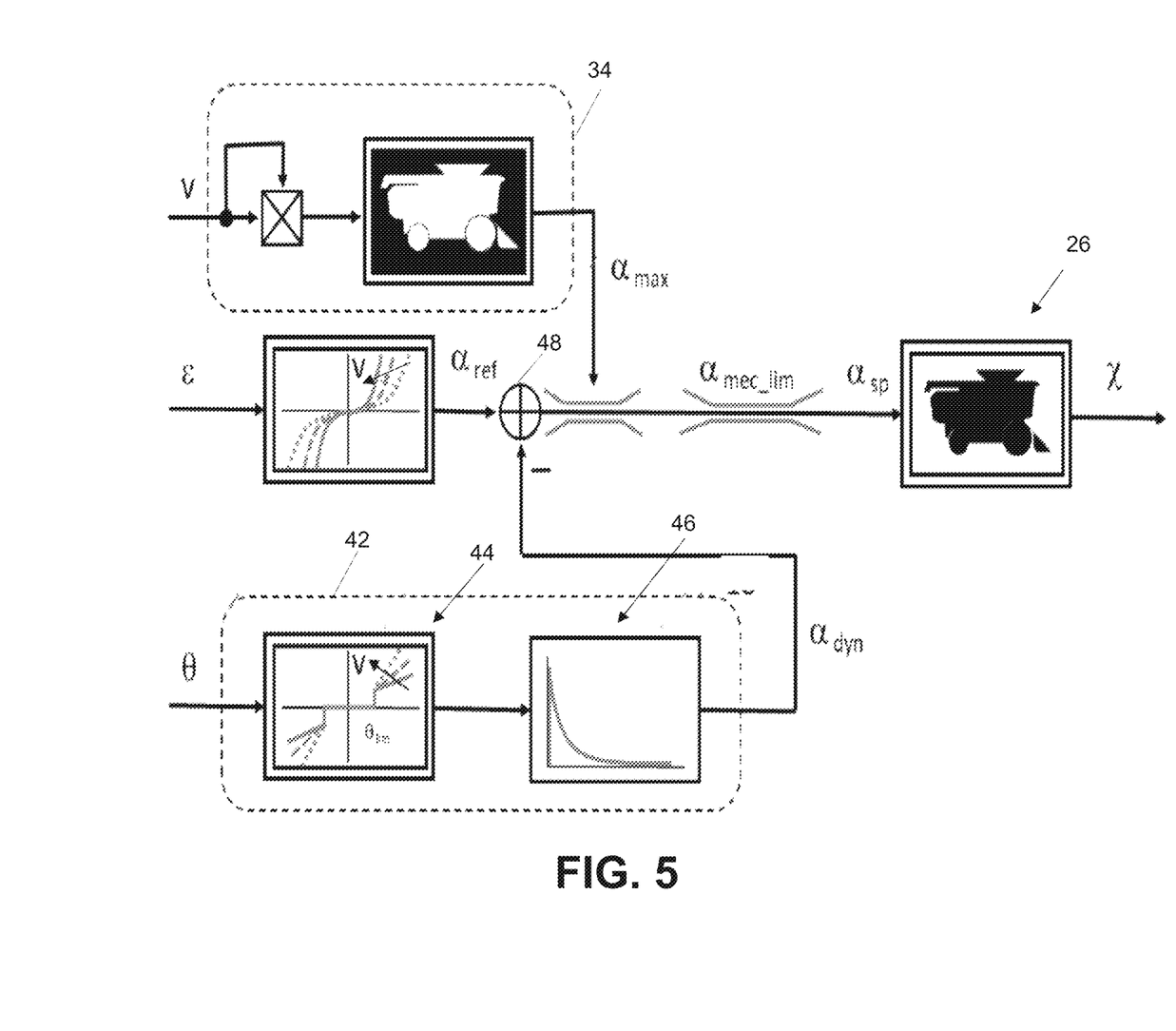
FIG. 5 is a schematic diagram that conceptually illustrates example rollover risk reduction system logic that implements dynamic stabilization with steering inputs (DSSI) functionality.

FIGS. 3-5 conceptually illustrate respective functionality of firmware/software and/or hardware of certain embodiments of a rollover risk reduction system that enable the prevention or mitigation of risk of a rollover event, with FIG. 3 illustrating ARC functionality, FIG. 4 illustrating (along with ARC functionality) SOA functionality, and FIG. 5 illustrating (along with ARC and SOA functionality) DSSI functionality. It should be appreciated by one skilled in the art that certain embodiments may utilize any combination of ARC, SOA, or DSSI functionality.

Referring to FIG. 3, shown is a conceptual illustration of ARC functionality 26 carried out by the ECU 16 (FIG. 2) in cooperation with other components of the rollover risk reduction system 12 illustrated in FIG. 2. In one embodiment, a first step to stabilize the harvester 10 (FIG. 1A) is to eliminate, electronically, the natural behavior of a rear-steering machine to oversteer at high speeds in road conditions. By the use of an HMI 14 (FIG. 2) with a force-feedback mechanism used in conjunction with return-to-center capability, this can be achieved. The HMI 14, in cooperation with the biasing device 20, provides a force (e.g., torque) that the operator experiences when handling the HMI 14. The force effectively tries to bring the HMI 14 to the central position. For instance, if the operator withdraws his or her hand from the HMI 14 upon negotiating the harvester 10 along a curve, the HMI 14 returns to a central position. Similarly, an operator in contact with the HMI 14 feels that force influencing the position of the HMI 14 to the center position. In conjunction with the force presented by the HMI 14 (e.g., via the biasing device 20), the steerable wheels of the harvester 10 also align with the harvester 10 (via the steer-by-wire system used in the harvester 10), with the result that the harvester 10 exhibits a "natural" or car suspension-like behavior that follow a straight-ahead path. The force varies according to the harvester speed (as determined, for instance, from the ground speed sensor 24 (FIG. 2)) based on a torque set-point provided by the ECU 16 (FIG. 1A). This force feedback feature and alignment to follow the straight-ahead path is referred to herein as an Active-Return-to-Center (ARC) capability.

As depicted conceptually in FIG. 3, the operator provides a steering command ($\epsilon$) that generates a steering angle reference value ($\alpha$ref) (28). The software function depicted in (28) reveals curves conceptually illustrating a relationship between the HMI movement a steering angle reference that is nonlinear and varies according to speed, with the output to the steering valve control provided by the ECU 16 in conjunction with the steering valve 22 (FIG. 1A) and steering cylinder. Also, the curves of the software function represent a torque profile that an operator physically experiences via the HMI 14/biasing device 20 (FIG. 1A) according to a force feedback function. The force the operator feels varies depending on the speed of the harvester 10 (FIG. 1A). Once electronically limited to a maximum steering angle provided by the mechanical steering system ($\alpha$mec_lim) (30) (the limit representing an end of stroke of the steering system that is stored in memory (e.g., ECU memory) during a calibration stage), the final steering angle set point ($\alpha$sp) is provided to the steering angle controller (e.g., ECU 16) that in one embodiment is part of the harvester 10 of FIG. 1A (32). The harvester 10 corners with a curvature ($\chi$). Due to the ARC capability, once the operator releases the HMI 14, the harvester 10 returns to a straight-ahead path.

Referring to FIG. 4, shown is a conceptual illustration of oversteering avoidance (SOA) functionality 34. As explained above, the SOA functionality 34 is shown combined with the ARC functionality 26, though in some embodiments, the SOA functionality 34 and ARC functionality 26 may not be combined in an embodiment of a rollover risk reduction system. SOA functionality 34 comprises limiting the maximal steering angle set point in relationship to the machine ground speed according to equation 1 described above. In one embodiment, a square value of the speed is calculated (36), and based on the geometry of the harvester 10 (FIG. 1A) (38), the maximum allowed steering angle ($\alpha$max) is calculated. In one embodiment, the geometry includes the rear axle length or distance and the height of the center of mass of the harvester 10. This value ($\alpha$max) is used in a limiter (40) to set a boundary to the original reference value ($\alpha$ref) provided by the HMI 14 (FIG. 2). Note that the geometry may be input (e.g., in a graphical user interface screen) by the operator, or accessed from local (or remote) memory.

FIG. 5 conceptually illustrates dynamic stabilization with steering inputs (DSSI) functionality 42. Although DSSI functionality 42 is depicted in combination with ARC functionality 26 and SOA functionality 34, some embodiments may omit ARC functionality 26 or SOA functionality 34. Digressing briefly, in some extreme corner conditions, even with ARC functionality 26 and/or SOA functionality 34 in place, the static stability of a rear wheel steering machine has limits. To increase, even more, the anti-rollover behavior of such machines, a dynamic software component may be added to the system. In one embodiment, a DSSI subset of functions (42) calculates this component, providing an overlaid software function (and hence no additional hardware) that provides an additional component to a steer-by-wire, steering angle set-point. The DSSI consists of a non-linear set of curves (44) proportional to the harvester speed (v) that creates an overlaid steering command after a certain rollover angle ($\theta$lim) is reached. Note that the input $\theta$ may be received via the machine inclination sensor 25 (FIG. 1A), which in some embodiments may be an inertial component of a GNSS receiver. As depicted in the software function 44, there is a respective x (input) and y (output) axis and nonlinear curves that convey that, at the input of a specific (e.g., threshold) roll angle theta ($\theta$), the software function 44 is triggered, providing a high input value to the software function 46. That is, to achieve immediate and fast response, an outcome of the function 44 (e.g., curves) goes through a control equation (46) (e.g., derivative with temporary lag mathematical equation or DT1) that should be tuned accordingly (e.g., to determine the size or magnitude of a response that is appropriate for the condition). In other words, software function 46 illustrates a timely step response that decreases slowly until it disappears, collectively representing a counter-steer movement that the steering system has to achieve. Note that for higher rollover angles, the higher the trigger and counter-steer response. The result of this function 46 is a dynamic steering input ($\alpha$dyn) that is added to the system (48) (e.g., counter-steer movement is added to the steering angle set-point). For instance, the dynamic steering input provides a single step or pulse response (e.g., torque response corresponding to a counter-steer) to the steering movement in a way that the center of mass (CM) of the harvester 10 (FIG. 1A) is pushed back to its stable position, avoiding a rollover event.

Figure 6:
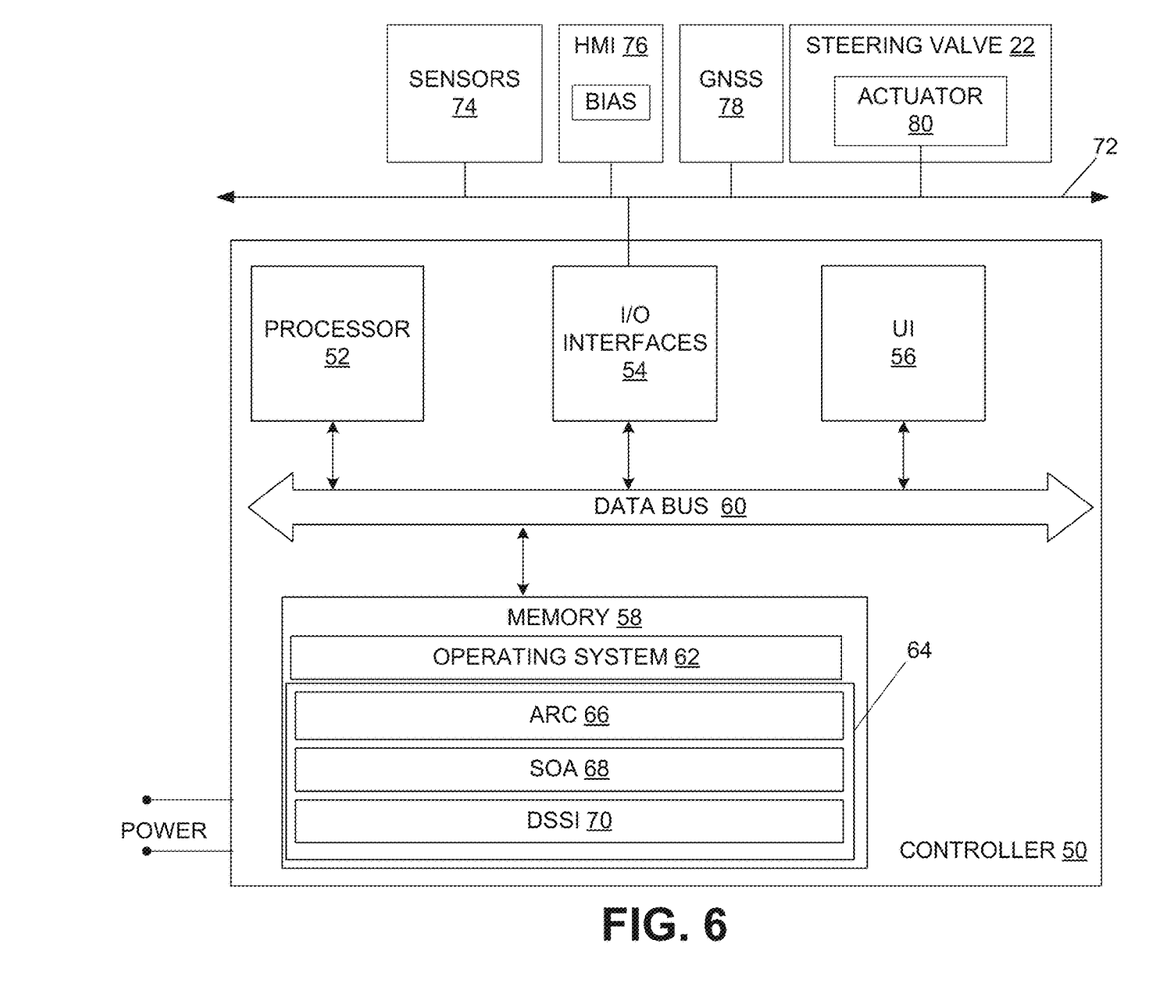
FIG. 6 is a block diagram that illustrates an embodiment of an example controller used in an embodiment of a rollover risk reduction system.

Having described various ARC, SOA, and DSSI functionality of certain embodiments of a rollover risk reduction system, attention is now directed to FIG. 6, which illustrates an embodiment of an example controller 50 that may be used in an embodiment of a rollover risk reduction system. Though emphasis in this disclosure is on the use of a single controller 50, in some embodiments, functionality of a rollover risk reduction system may be achieved through the use of plural controllers operating under distributed control. As explained above, redundancy may be implemented, where for operations satisfied using a single controller, two or more controllers may be used to enable redundancy. Similarly, where operation is satisfied using two or more controllers operating in a distributed manner (e.g., peer-to-peer, master-slave, etc.), redundancy is achieved using four or more controllers, respectively. One having ordinary skill in the art should appreciate in the context of the present disclosure that the example controller 50 is merely illustrative, and that some embodiments of the controller 50 may comprise fewer or additional components, and/or some of the functionality associated with the various components depicted in FIG. 6 may be combined, or further distributed among additional modules, in some embodiments. In some embodiments, functionality of modules described herein may be implemented as software, hardware, or a combination of software and hardware. In some embodiments, functionality of the controller 50 may be implemented according to other types of devices, including a programmable logic controller (PLC), FPGA device, ASIC device, among other devices. It should be appreciated that certain well-known components of computer devices are omitted here to avoid obfuscating relevant features of the controller 50.

In one embodiment, the controller 50 comprises one or more processors, such as processor 52, input/output (I/O) interface(s) 54, a user interface (UI) 56, and memory 58, all coupled to one or more data busses, such as data bus 60.

The memory 58 may include any one or a combination of volatile memory elements (e.g., random-access memory RAM, such as DRAM, and SRAM, etc.) and nonvolatile memory elements (e.g., ROM, hard drive, tape, CDROM, etc.). The memory 58 may store a native operating system, one or more native applications, emulation systems, or emulated applications for any of a variety of operating systems and/or emulated hardware platforms, emulated operating systems, etc. In the embodiment depicted in FIG. 6, the memory 58 comprises an operating system 62 and rollover risk reduction software 64. In one embodiment, the rollover risk reduction software 64 comprises an ARC module 66, an SOA module 68, and a DSSI module 70. It should be appreciated by one having ordinary skill in the art that in some embodiments, additional or fewer software modules (e.g., combined functionality) may be employed in the memory 58 or additional memory. In some embodiments, a separate storage device may be coupled to the data bus 60, such as a persistent memory (e.g., optical, magnetic, and/or semiconductor memory and associated drives).

The processor 52 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 50.

The I/O interfaces 54 provide one or more interfaces to a network comprising a communication medium 72, which may be a wired medium (e.g., controller area network (CAN) bus) as depicted in FIG. 6, a wireless medium (e.g., Bluetooth channel(s)), or a combination of wired and wireless mediums or media, as explained similarly above in association with FIG. 2. In other words, the I/O interfaces 54 may comprise any number of interfaces for the input and output of signals (e.g., analog or digital data) for conveyance over one or more communication mediums. In the depicted embodiment, plural sensors 74, an HMI 76, a GNSS receiver 78, and an actuator 80 (e.g., solenoid, for the steering valve 22 described in association with FIG. 2) are coupled to the medium 72, enabling communication of signals/data with the controller 50 via the I/O interfaces 54. In one embodiment, the sensors 74 comprise the wheel angle sensor 18, the ground speed sensor 24, and/or the machine inclination sensor 25 described in association with, and illustrated in, FIG. 2, and the HMI 76 is similar to the HMI 14 (FIG. 2). As explained above, the machine inclination sensor 25 may be embodied as an inertial component (e.g., gyroscope) of the GNSS receiver 78. In some embodiments, the biasing device 20 (FIG. 2) is included with the HMI 76 (as shown in the dashed box labeled "bias" in FIG. 6). In some embodiments, additional components may be coupled to the medium 72, including other sensors, other controllers, other actuators, and/or telephony/radio components (e.g., cellular and/or radio frequency (RF) modem), the latter enabling communications with other networks, systems or devices external to the harvester 10 (FIG. 1A).

The user interface (UI) 56 may be an interface that is separate and additional to the HMI 76, including a keyboard, mouse, microphone, touch-type display device, head-set, and/or other devices (e.g., switches) that enable input by an operator and/or outputs (e.g., visual and/or audible) feedback to the operator. In some embodiments, one or more functionality of the UI 56 may be integrated with the HMI 76.

Note that in some embodiments, the manner of connections among two or more components may be varied. For instance, in some embodiments, the user interface 56 may be directly connected to the medium 72, and in communication with the controller 50 via the I/O interfaces 54. As another example, the HMI 76 may be directly coupled to the data bus 60. These and/or other variations are contemplated to be within the scope of the disclosure as would be appreciated by one having ordinary skill in the art.

The rollover risk reduction software 64 and associated modules 66-70 comprise executable code/instructions that, when executed by the processor 52, achieve the ARC 26, SOA 34, and DSSI 42 functionality as described above and illustrated in association with FIGS. 3-5, based on receipt of sensor signals (e.g., ground speed, steering angle, rollover angle, etc.), and machine information (e.g., machine geometry, including height of center of mass, rear axle length) that may be accessed via local storage, remote storage, or received via operator input.

Execution of the rollover risk reduction software 64 and associated modules 66-70 is implemented by the processor 52 under the management and/or control of the operating system 62. In some embodiments, the operating system 62 may be omitted and a more rudimentary manner of control implemented. In some embodiments, functionality of the software 64, 66, 68, and 70 may be implemented as hardware (e.g., digital logic gates), or as a combination of hardware and software.

When certain embodiments of the controller 50 are implemented at least in part with software (including firmware), as depicted in FIG. 6, it should be noted that the software can be stored on a variety of non-transitory computer-readable storage medium for use by, or in connection with, a variety of computer-related systems or methods. In the context of this document, a computer-readable storage medium may comprise an electronic, magnetic, optical, or other physical device or apparatus that may contain or store a computer program (e.g., executable code or instructions) for use by or in connection with a computer-related system or method. The software may be embedded in a variety of computer-readable storage mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the controller 50 are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 7:
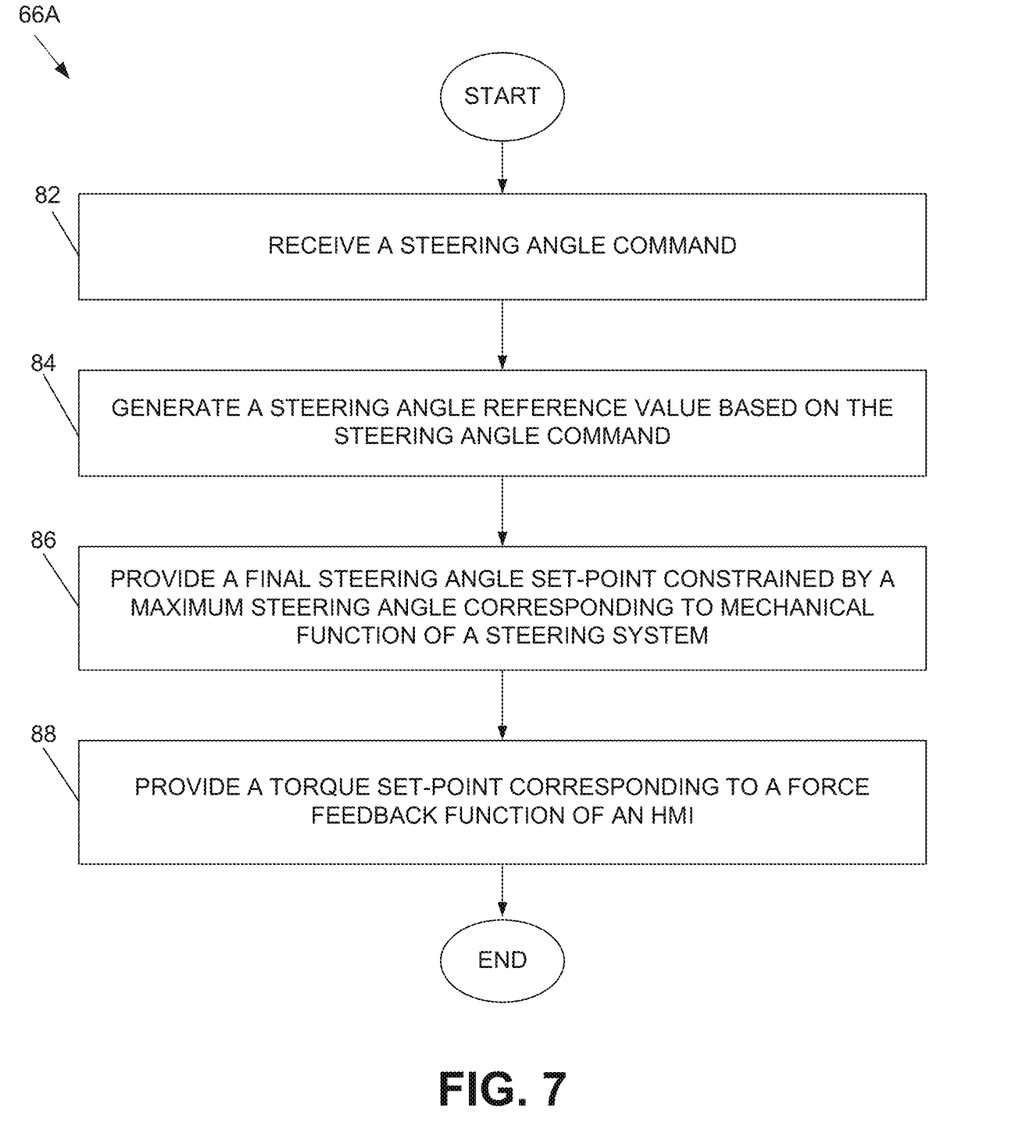
FIG. 7 is a flow diagram that illustrates an embodiment of an example ARC method.
Figure 8:
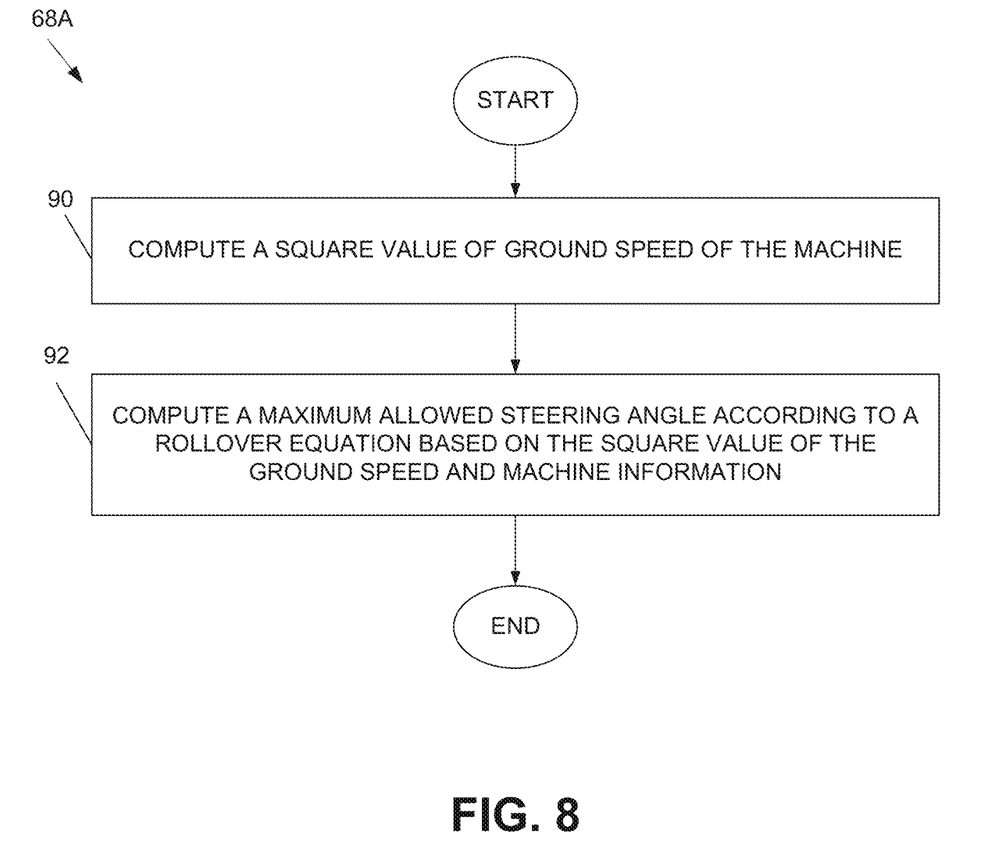
FIG. 8 is a flow diagram that illustrates an embodiment of an example SOA method.
Figure 9:
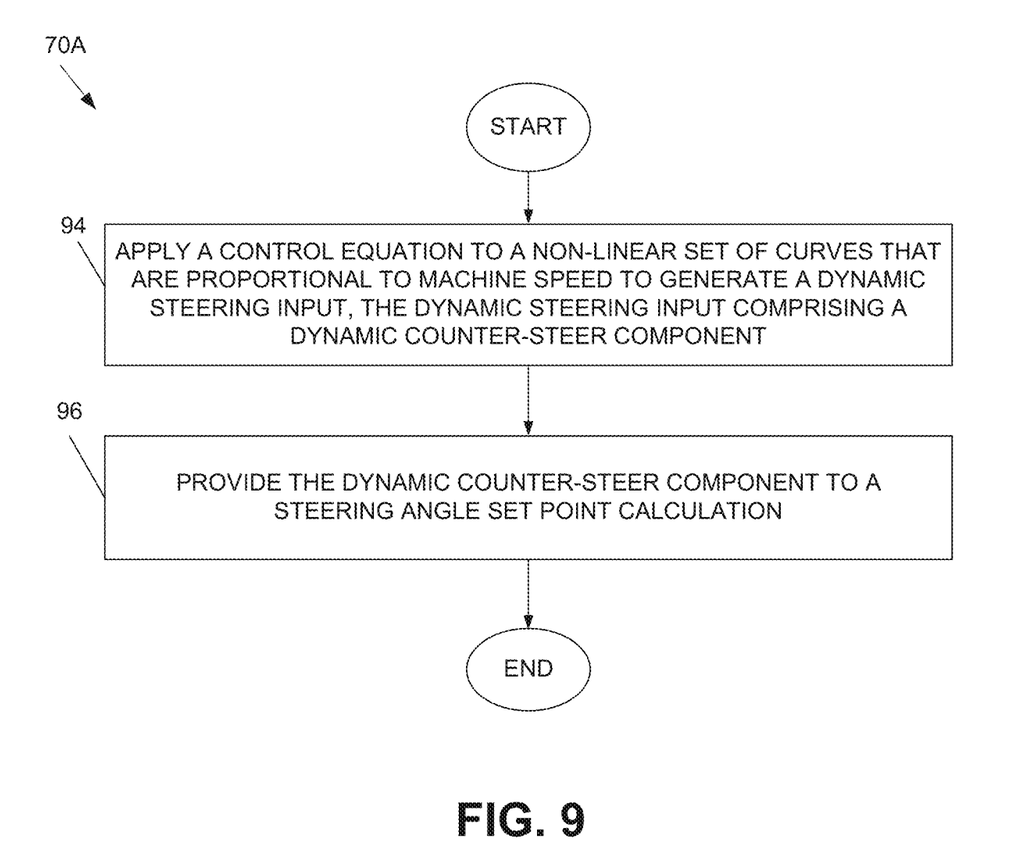
FIG. 9 is a flow diagram that illustrates an embodiment of an example DSSI method.

Referring now to FIGS. 7-9, shown are flow diagrams that illustrate functionality of the ARC module 66, the SOA module 68, and the DSSI module 70 of the rollover risk reduction software 64 as described above in association with FIG. 6. Referring to FIG. 7, an ARC method 66A, implemented in one embodiment by the ARC module 66, comprises receiving a steering angle command (82), generating a steering angle reference value based on the steering angle command (84), providing a final steering angle set-point constrained by a maximum steering angle corresponding to mechanical function (e.g., end stroke position as previously determined during a calibration and stored in memory) of a steering system (86), and providing a torque set-point corresponding to a force feedback function of an HMI (88). As explained above, the force feedback is the force (e.g., torque), which varies with speed of the harvester 10 (FIG. 1A), that influences the HMI to a center position (and which the operator may experience when his hand is in contact with the HMI). It is noted that the ARC method 66A corresponds to the ARC functionality 26 of FIG. 3.

Referring to FIG. 8, an SOA method 68A, implemented in one embodiment by the SOA module 68, comprises computing (calculating, computing and calculating used interchangeably herein) a square value of ground speed of the machine (90), and computing a maximum allowed steering angle according to the rollover equation (e.g., Equation 1) based on the square value of the ground speed and machine information (92). In one embodiment, the machine information includes a length of a rear axle of the machine (e.g., harvester 10, FIG. 1A) and a height at center of mass of the machine. The maximum allowed steering angle corresponding to a maximum (curvature) radius at a given speed without having a rollover condition. The SOA method 68A corresponds to the SOA functionality 34 of FIG. 4.

Referring to FIG. 9, a DSSI method 70A, implemented in one embodiment by the DSSI module 70, comprises applying a control equation to a non-linear set of curves that are proportional to machine speed to generate a dynamic steering input, the dynamic steering input comprising a dynamic counter-steer component (94), and providing the dynamic counter-steer component to a steering angle set point calculation (96). The counter-steer component causes a brief counter-steer (e.g., single step torque) response to a prior steering movement of the machine. The DSSI method 70A corresponds to the DSSI functionality 42 of FIG. 5.

Figure 10:
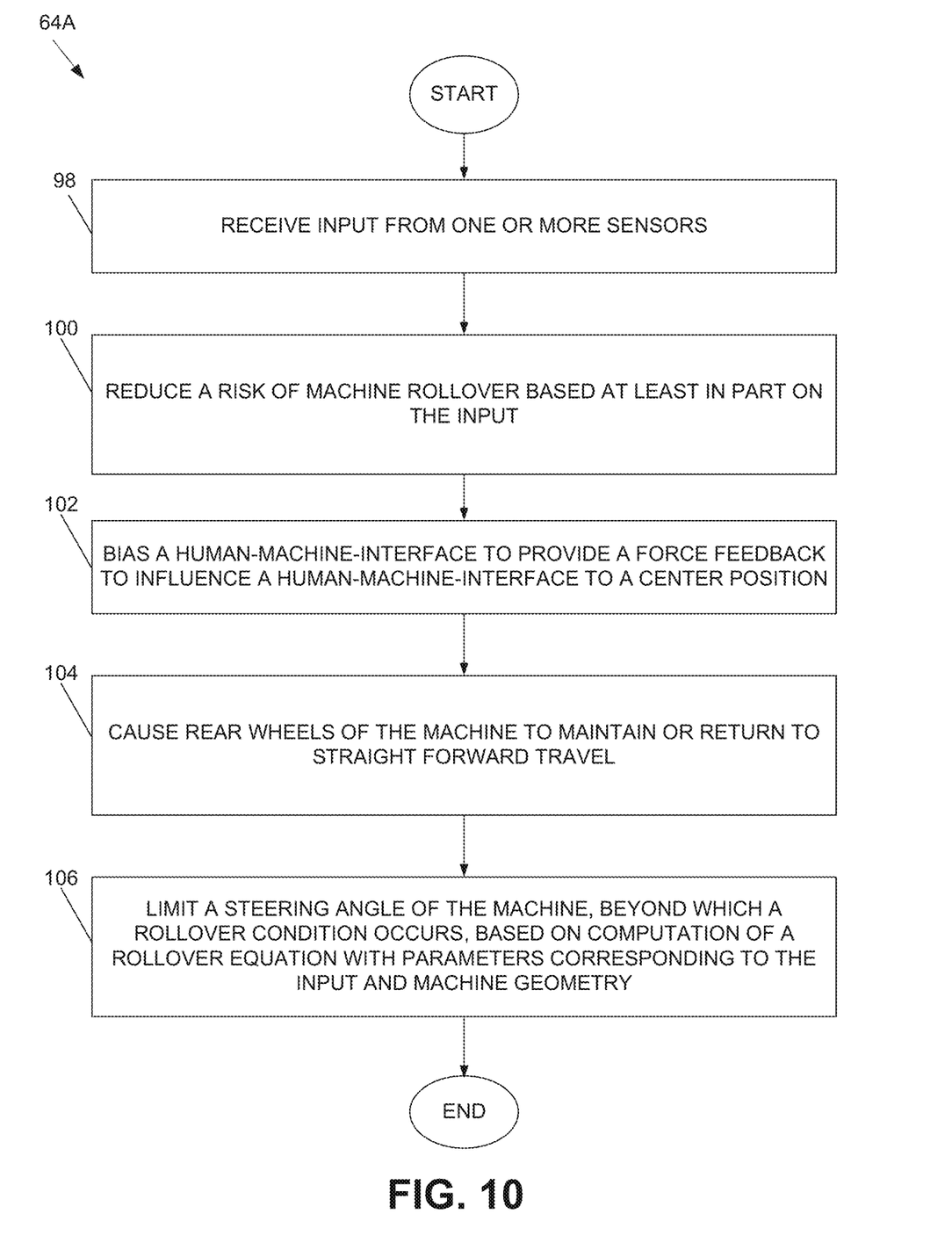
FIG. 10 is a flow diagram that illustrates an embodiment of an example rollover risk reduction method using a combination of at least ARC and SOA methods.

Having described certain embodiments of a rollover risk reduction system, it should be appreciated within the context of the present disclosure that one embodiment of a rollover risk reduction method, denoted as method 64A (e.g., as implemented at least in part by the rollover risk reduction software 64 along with modules 66, 68, FIG. 6) and illustrated in FIG. 10, comprises receiving input from one or more sensors (98) and reducing a risk of machine rollover (100) based at least in part on the input. To achieve reducing a risk of machine rollover (100), one embodiment of the rollover risk reduction method 64A uses ARC 26 and SOA functionality 34 by: biasing a human-machine-interface to provide a force feedback to influence a human-machine-interface to a center position (102); causing rear wheels of the machine to maintain or return to straight forward travel (104); and limiting a steering angle of the machine, beyond which a rollover condition occurs, based on computation of a rollover equation with parameters corresponding to the input and machine geometry (106). Note that in some embodiments, the DSSI functionality 42 (FIG. 5) may be added, on any combination of ARC, SOA, and DSSI functionality may be implemented. The causing of the rear wheels to maintain or return to a straight forward travel may be achieved via the ARC module 66, executed by the processor 52, feeding input (e.g., steering angle set-point) to the actuator 80 of the steering valve, which in turn fluidly communicates with the hydraulic circuit of the steering system (e.g., cylinders of the rear wheels, hydraulic pump, etc.) to cause the alignment of the rear wheels.

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure. In some embodiments, steps may be omitted or added.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Although the control systems and methods have been described with reference to the example embodiments illustrated in the attached drawing figures, it is noted that equivalents may be employed and substitutions made herein without departing from the scope of the disclosure as protected by the following claims.

At least the following is claimed:

1. A steering system for a machine, the steering system comprising:
a steer-by-wire system configured to provide rear wheel steering, the steer-by-wire system comprising:
a human-machine-interface (HMI) configured to provide a force feedback to the HMI that influences the HMI to a center position;
plural sensors; and
one or more controllers configured by executable code to receive input from one or more of the plural sensors and reduce a risk of rollover by:
causing rear wheels of the machine to maintain or return to straight forward travel in conjunction with the force feedback;
limiting a steering angle of the machine, beyond which a rollover condition occurs, based on computation of a rollover equation with parameters corresponding to the input and a machine geometry; and
providing a steering command based on a roll angle of the machine exceeding a threshold rollover angle based on input from the plural sensors,
wherein the one or more controllers are configured to provide the steering command by applying a control equation to a non-linear set of curves that are proportional to machine speed to generate a dynamic steering input, the dynamic steering input comprising a counter-steer component provided to a steering angle set-point calculation.

2. The steering system of claim 1, wherein the plural sensors include an inertial sensor, and wherein the one or more controllers are further configured to provide a steering command based on a roll angle of the machine exceeding a threshold rollover angle based on input from the inertial sensor.

3. The steering system of claim 1, wherein the one or more controllers are configured to cause the rear wheels to maintain or return to straight forward travel by:
receiving a steering angle command from the HMI based on operator input;
generating a steering angle reference value based on the steering angle command; and
providing a final steering angle set-point constrained by a maximum steering angle corresponding to mechanical function of the steering system.

4. The steering system of claim 1, wherein the counter-steer component corresponds to a single step torque response.

5. The steering system of claim 1, wherein the control equation comprises a derivative with temporary lag mathematical equation.

6. The steering system of claim 1, wherein the HMI comprises a steering control for the machine that is configured to be directly manipulated by an operator.

7. The steering system of claim 1, wherein the force feedback is experienced by an operator in contact with the HMI based on cooperation between the HMI and a biasing device and a torque set-point received by the one or more controllers.

8. The steering system of claim 7, wherein the force feedback increases force as a function of speed of the machine.

9. The steering system of claim 7, wherein the biasing device comprises a spring, a resilient device, or an electro-magnetic motor.

10. A steering system for a machine, the steering system comprising:
a steer-by-wire system configured to provide rear wheel steering, the steer-by-wire system comprising:
a human-machine-interface (HMI) configured to provide a force feedback to the HMI that influences the HMI to a center position;
plural sensors; and
one or more controllers configured by executable code to receive input from one or more of the plural sensors and reduce a risk of rollover by:
causing rear wheels of the machine to maintain or return to straight forward travel in conjunction with the force feedback; and
limiting a steering angle of the machine, beyond which a rollover condition occurs, based on computation of a rollover equation with parameters corresponding to the input and a machine geometry,
wherein the one or more controllers are configured to limit the steering angle of the machine based on—
computing a square value of ground speed, and
computing a maximum allowed steering angle according to the rollover equation based on the square value of the ground speed, a length of a rear axle of the machine, and a height of center of mass of the machine, the maximum allowed steering angle corresponding to a maximum radius at a given speed without having a rollover condition.

11. The steering system of claim 10, wherein the one or more controllers are configured to limit the maximum allowed steering angle to within boundaries of a maximum mechanical limit of steering.

12. The steering system of claim 10, wherein the rollover equation consists of $r=2*(h/(d*g))*v^2$, where r equals a rollover curvature radius from the center of mass of the machine, h equals the height of the machine at the center of mass, d equals the rear axle length or distance, g equals earth gravity, and v equals velocity or the ground speed of the machine.

13. The steering system of claim 10, wherein the one or more controllers are configured to limit a steering angle reference value corresponding to a steering command received from the HMI using the maximum allowed steering angle.

14. A non-transitory, computer readable storage medium comprising instructions that, when executed by one or more processors, causes the one or more processors to reduce a risk of rollover in a rear wheel steering machine by:
receiving input from one or more sensors;
biasing a human-machine-interface (HMI) to provide a force feedback to influence the HMI to a center position;
causing rear wheels of the machine to maintain or return to straight forward travel in conjunction with the force feedback;
limiting a steering angle of the machine, beyond which a rollover condition occurs, based on computation of a rollover equation with parameters corresponding to the input and a machine geometry; and providing a steering command based on a roll angle of the machine exceeding a threshold rollover angle, wherein providing the steering command comprises applying a control equation to a non-linear set of curves that are proportional to machine speed to generate a dynamic steering input, the dynamic steering input comprising a counter-steer component provided to a steering angle set-point calculation to cause a counter-steer to a prior steering movement of the machine.

15. A rear wheel steering method for a machine, the steering method comprising:

receiving input from one or more sensors; and reducing a risk of machine rollover by:
biasing a human-machine-interface (HMI) to provide a force feedback to influence the HMI to a center position;
causing rear wheels of the machine to maintain or return to straight forward travel in conjunction with the force feedback;
limiting a steering angle of the machine, beyond which a rollover condition occurs, based on computation of a rollover equation with parameters corresponding to the input and a machine geometry; and
providing a steering command based on a roll angle of the machine exceeding a threshold rollover angle, wherein providing the steering command comprises applying a control equation to a non-linear set of curves that are proportional to machine speed to generate a dynamic steering input, the dynamic steering input comprising a counter-steer component provided to a steering angle set-point calculation to cause a counter-steer to a prior steering movement of the machine.

16. The steering method of claim 15, wherein the causing further comprises:

receiving a steering angle command;

generating a steering angle reference value based on the steering angle command; and providing a final steering angle set-point constrained by a maximum steering angle corresponding to mechanical function of a steering system.

17. A rear wheel steering method for a machine, the steering method comprising:

receiving input from one or more sensors; and reducing a risk of machine rollover by:
biasing a human-machine-interface (HMI) to provide a force feedback to influence the HMI to a center position;
causing rear wheels of the machine to maintain or return to straight forward travel in conjunction with the force feedback; and
limiting a steering angle of the machine, beyond which a rollover condition occurs, based on computation of a rollover equation with parameters corresponding to the input and a machine geometry,
wherein the step of limiting the steering angle of the machine includes the steps of—
computing a square value of ground speed of the machine; and
computing a maximum allowed steering angle according to the rollover equation based on the square value of the ground speed, a length of a rear axle of the machine, and a height at center of mass of the machine, the maximum allowed steering angle corresponding to a maximum radius at a given speed without having a rollover condition.

* * * * *